United States Patent [19]

Millman

[11] Patent Number: 4,871,550

[45] Date of Patent: Oct. 3, 1989

[54] NUTRIENT COMPOSITION FOR ATHLETES AND METHOD OF MAKING AND USING THE SAME

[76] Inventor: Phillip L. Millman, 15823 Dodrill Dr., Hacienda Heights, Calif. 91745

[21] Appl. No.: 904,546

[22] Filed: Sep. 5, 1986

[51] Int. Cl.[4] .................. A61K 33/42; A61K 31/425; A61K 33/00; A61K 33/14; A61K 31/70; A61K 31/595; A61K 31/195; A61K 31/165; A61K 31/14; A61K 31/135

[52] U.S. Cl. .................. 424/601; 424/600; 424/678; 424/680; 514/23; 514/168; 514/365; 514/561; 514/562; 514/617; 514/643; 514/646; 514/905

[58] Field of Search .............. 424/128, 141, 144, 145, 424/150, 153–154; 514/905, 564, 365; 426/656, 73, 74

[56] References Cited

U.S. PATENT DOCUMENTS

| | | | |
|---|---|---|---|
| 3,697,287 | 10/1972 | Winitz | 426/656 |
| 4,309,417 | 1/1982 | Staples | 424/128 |
| 4,687,782 | 8/1987 | Brantman | 514/561 |

OTHER PUBLICATIONS

U.S. Trademark #1316479, "Weider" First Used in Commerce, 7/76, for Dietary Food Supplements, Registered 1/29/85.

*Primary Examiner*—Douglas W. Robinson
*Assistant Examiner*—Raymond J. Henley, III
*Attorney, Agent, or Firm*—Knobbe, Martens, Olson & Bear

[57] ABSTRACT

A unique, chemically-defined nutrient composition is disclosed which can enable stressed, catabolic, marathon athletes to achieve superior performance. The diet provides substantially all of the essential nutrients along with flavoring aids in simple, readily available form and comprises free amino acids, vitamins, minerals and trace elements, electrolytes, simple and complex carbohydrates, and flavoring aids. This diet benefits athletes because it provides for substantially all of the nutritional requirements, allows for reproducibility and user familiarity through precise chemical definition, supplies optimal nutritional requirements during training and competition through unique tailoring to the nutritional requirements of an individual athlete, requires minimal digestive energy, and encourages maximal absorption of nutrients. A specific mixture of amino acids, carbohydrates, and flavoring aids is used to achieve superior taste. In addition, due to the unique method provided in the present invention, all of the solid nutrients rapidly and completely dissolve in tap water under ordinary usage conditions. This enables the final blend to be easily dissolved in an appropriate volume of tap water prior to use by the athlete.

6 Claims, 1 Drawing Sheet

NUTRIENT COMPOSITION FOR ATHLETES AND METHOD OF MAKING AND USING THE SAME

BACKGROUND OF THE INVENTION

The present invention relates to nutrient compositions for athletes, to be used in connection with training and competition, as well as to the methods for producing and using those compositions. In particular, the invention relates to an orally ingestible palatable blend which provides substantially all of the nutritional, carbohydrate, and energy requirements of an athlete under conditions of physical stress, without interfering with fluid absorption or causing gastrointestinal disturbances. The invention additionally relates to a new method of preparation of solid nutrients which allows for rapid and complete dissolution of the final blend in tap water under ordinary use conditions.

The use of sport drinks to satisfy various requirements of athletes during training and competition is known. Known drinks are used to provide energy and replace lost electrolytes and nutrients. Sport drinks that are currently on the market generally fall into one of four categories. The first category includes sports drinks that contain only sugar and water. The sports drink marketed under the name "Max" by Coca Cola Company is an example. That drink contains a five percent (5%) solution of dextrose and malto-dextrin.

The second category includes sports drinks that consist of sugars, plus some electrolytes, in water.

The third category consists of sport drinks that contain sugars, some electrolytes, and some vitamins. The sports drinks "Gatorade" (marketed by Stokely-Van Camp, Inc.) and "Exceed" (marketed by the Ross division of Abbott Laboratories) are examples. Gatorade contains a six percent (6%) solution of sucrose and glucose, 220 mg of sodium and 50 mg of potassium per serving and some vitamin C. "Exceed" has glucose polymers and fructose, 280 mg of sodium, 430 mg of potassium, 380 mg chloride and other electrolytes in every 8 ounce serving.

The fourth category includes sports drinks consisting of sugars, some electrolytes, some vitamins. and some minerals. The sports drinks "Body Fuel 450" (marketed by Vitex Foods, Inc.), and "Pripps Plus" (marketed by Aktiebolaget Pripps Bryggrier) are examples.

Although not directed to the particular nutritional needs of athletes, U.S. Pat. No. 3,697,287 to Winitz discloses what is said to be a palatable food composition which contains all of the essential amino acids, essential minerals, and carbohydrates. The invention disclosed therein claims to achieve palatability by (a) minimizing amino acids or amino acid derivatives which contain sulfhydryl (SH) groups; (b) minimizing amino acids or their derivatives whose taste is incompatible with the flavor of the mixture of the other ingredients; and (c) minimizing the use of amino acids or their derivatives that are not of sufficient purity. Winitz also discloses a pH dependence of the flavor of certain ingredients. That invention also discloses the interchangeability of nutritional equivalents of amino acids, for example, the esters, amides, and salt derivatives thereof or precursors such as peptones or peptides. Inclusion of these can result in slower absorption and consumption of greater amounts of digestive energy compared to the composition of the present invention, factors of great importance to a high performance athlete. Other disadvantages of the use of the Winitz composition in the context of training and competition can be understood from the following disclosure.

None of the prior art drinks can be used as the exclusive source of nutrition during periods of training or competition, as none of the available sports drinks will provide for substantially all of the nutritional requirements of the body under stress. For the purposes of this invention, a "stress" condition exists when an individual's metabolic rate exceeds approximately 500 kcal per hour as a result of physical exertion, or, alternatively, when through sustained exertion an individual maintains a pulse rate in excess of 125 beats per minute for a period of 90 minutes or more. Additional nutrient sources are needed during long training sessions and competitions. As well as failing to provide for substantially all of the athlete's nutritional needs, known sports drinks are attended by a number of additional disadvantages.

One disadvantage of prior art formulations is the generally low gastrointestinal tolerance. Tolerance can be described as the capacity of the gastrointestinal tract to ingest and digest food. The proper balance of amino acids, carbohydrates, electrolytes, vitamins, minerals and trace elements creates the proper lumenal environment (e.g., osmolality, etc.) to prevent the flow of water and electrolytes into the lumen of the small bowel which may cause distention of the bowel, thus creating pressure, pain and cramps from increased peristalsis. Prior art products generally have a high osmotic load which creates an increasing fluid volume in the large bowel, causing diarrhea. Diarrhea causes dehydration and magnifies the electrolyte imbalance which has a catastrophic impact on athletes undergoing the stress of training and competition.

Presently available sources of nutrition for athletes are additionally not optimized to provide maximal rates of absorption. Foods that are slowly absorbed during digestion do not provide the body with immediate energy, whereas nutrients which quickly cross the mucosal membranes into the blood provide more immediate energy. Moreover, sports drinks and foods which require large amounts of digestive energy will not be optimally beneficial to the athlete during training and competition. During exercise, most of the blood is shunted or diverted from the gastrointestinal tract to the muscle groups performing the exercise. Hence, any diversion of blood back to the gastrointestinal track for digestion, which will result, for example, from a diet comprising fats or polypeptide protein, could reduce the blood available to the muscles, thereby diminishing performance. On the other hand, as a result of sustained exertion and physical stress, digestion of complex materials may proceed too slowly to provide adequate nutrition to the athlete during such exertion.

Another problem athletes face is familiarity with, and reproducibility of, their diet. It is well known that if an athlete eats something during training or competition that his body is not used to, performance will suffer.

Another important consideration in the design of a complete nutrient composition for athletes is the effect of stress upon the breakdown of muscle protein. Under conditions of stress there is an increased use of amino acids from muscle tissue as an energy source, and an increased percentage of total calories are supplied by the direct oxidation of the branched-chain amino acids leucine, isoleucine and valine. See, e.g., K. J. Fchott, J. Jehrmann, U. P:otter, V. Neuhoff "On the Role of Branched-Chaim Amino Acid in Protein Metabolism of Skeletal Muscle", *Journal of Z Naturforsch*, May-June 1985, line 40, pgs. 427–437; S. F. Lowry, G. D. Horowitz, D. Rose, M. F. Brennan "Influence of Nutritional Status on Exertion Induced Forearm Amino Acid Metabolism in Normal Man", *Journal of Surgical Research*, May 1984, Vol. 36, pgs. 438–445; D. Horst, N. D. Grace, H. O. Conn, E. Schiff, S. Schenker, A. Viteri, D. Law, C. E. Atterbury "Comparison of Dietary Protein With an Oral, Branched-Chain Enriched Amino Acid Suplement in Chronic Portal - Sestemic Encephalopathy", *Journal of Hepatology*, March-April 1984, Vol. 4, pgs. 279–287; A. E. Harper, R. H. Miller, K. P. Block "Branched-Chain Amino Acid Metabolism", *Annual Review of Nutrition*, 1984, Vol. 4, pgs. 409–454; and F. B. Cerra, J. E. Macuski, E. Chute, N. Newer, K. Teasley, J. Lysne, E. P. Shronts, S. N. Konstantinides "Branched-Chain Metabolic Support, a prospective, Randomized, Double Blind Trial in Surgical Stress", *Annals of Surgery*, March 1984, Vol. 199, pgs. 286–291. Urinary excretion of nitrogen, resulting from the breakdown of muscle protein, is high during conditions of stress. Branched-chain amino acids exert a nitrogen retention effect when ingested during conditions of stress.

An additional disadvantage of the presently available sports drinks is that few have a palatable taste. Taste or palatability is an important parameter for a sports drink or nutrition source. Excellent taste is not easily achieved for a sports drink or nutrition source for an athlete as the sense of taste changes with the metabolic state of the individual.

Furthermore, standard methods for the preparation of known solid nutrient blends are inadequate for the more complex blends necessary for a complete nutrient composition for athletes. Standard methods of preparation of solid chemical blends typically involve simple weighing and blending steps. As an example, the most straightforward standard method of preparation of a solid chemical blend is a procedure involving the individual weighing of each of the raw materials followed by a simple mixing or milling of all of the solids together under low mixing speeds for a defined period of time. As the complexity of the composition increases, however, it has been discovered that more steps and unique methods of preparation are required. It was determined that the more straightforward methods for the preparation of solid nutrient blends could not achieve a final blend which could be rapidly and completely dissolved in tap water under ordinary use conditions. The failure of these standard methods was caused mainly by the insolubility of several amino acids, particularly hydrophobic and aromatic amino acids, e.g., leucine, valine, phenylalanine, tryptophan, tyrosine, aspartic acid and glutamic acid.

SUMMARY OF THE INVENTION

It is therefore an object of the present invention to provide a sports drink for athletes that meets substantially all of the nutritional requirements of a body under stress, can be chemically defined for reproducibility and user familiarity, provides an optimal training and competition diet that can be digested with minimal energy, and can be quickly absorbed. It is another object of the present invention to provide a sports drink as above which contains a high proportion of branched-chain amino acids, will not cause gastrointestinal intolerance or irritation, and has acceptable to good taste and palatability.

Still a further object of the present invention is to provide a dependable method for preparation of a nutrient composition, so that it will consistently achieve rapid and complete dissolution in tap water under ordinary use conditions.

In accomplishing the foregoing objects, there has been provided in accordance with one aspect of the present invention, a palatable, orally ingestible nutrient blend, which provides substantially all of the nutritional, carbohydrate, and energy requirements of an athlete under conditions of physical stress, without interfering with fluid absorption or causing gastrointestinal disturbances. The blend comprises essential and preferably also non-essential amino acids, nutrient factors which may include vitamins, trace elements and minerals, and may also include carbohydrates, electrolytes and one or more flavoring aids. The final blend is water soluble and can supply, in a volume that may reasonably be ingested in one day, as much as about 10,000 or even 20,000 kcal. The amino acids contained in the blend exist in a substantially pure, free, unhydrolyzed state and preferably the weight percent of the essential amino acids is high in relation to, and may exceed the weight percent of the non-essential amino acids. In addition to containing a high essential to non-essential amino acid ratio, the blend contains an enhanced branched chain amino acid content, and a high carbohydrate calorie-nitrogen ratio to satisfy caloric and protein synthesis requirements during stress. Particular mixtures of amino acids, carbohydrates and flavoring aids are used to achieve superior taste, and the diet will not cause gastrointestinal intolerance or irritation in the healthy individual.

In accordance with another aspect of the present invention, there has been provided a method for producing an orally ingestible, palatable nutrient blend, which provides substantially all of the nutritional, carbohydrate and energy requirements of an athlete under conditions of physical stress without interfering with fluid absorption or causing gastrointestinal disturbances. The method according to the present invention produces a composition that can be readily dissolved in an appropriate volume of tap water with simple stirring or shaking prior to use. Powdered compositions to make a 500 ml portion ordinarily can be solubilized under such conditions in from 1 to 6 minutes, and preferably in less than about 3 minutes.

The method for preparing the nutrient composition comprises the steps of dry blending a first mixture of weighed amino acids, and dry blending a second mixture comprising nutrient factors, which may include vitamins, trace elements and minerals. Thereafter, an amount of each of those first and second mixtures is blended together with simple and complex carbohydrates, electrolytes, and flavoring aids until a uniform consistency is achieved.

Further objects, features and advantages of the present invention will become apparent from the detailed description of preferred embodiments which follows, when considered together with the attached examples and claims.

DETAILED DESCRIPTION OF PREFERRED EMBODIMENTS

Current research on amino acids has disclosed that high branched-chain amino acids, including valine, leucine, and isoleucine, are required to maintain and repair cellular integrity in the stressed marathon athlete. See authorities cited supra. It is further recognized that certain combinations of these high branched-chain amino acids are significantly more beneficial in maintaining cellular integrity and repair than others. On the other hand, the branched-chain amino acid component also affects the palatability of the nutrient composition. Valine, for example, imparts an undesirable flavor to the composition. Thus, the composition of the present invention has been carefully optimized in light of competing objectives. The weight percentages of branched-chain amino acids for Experiments 1-5 (infra), as a percentage of total amino acids, are illustrated in Table 1.

TABLE 1

Proportion of Branched Chain Amino Acids, as a Weight Percent of Total Amino Acids

|  | Invention | Prior Art |
|---|---|---|
| Example 1 | 22.5% | 13.6% |
| Example 2 | 40.2% | 13.4% |
| Example 3 | 27.2% | 15.4% |
| Example 4 | 42.19% | 15.1% |
| Example 5 | 27.2% | 15.4% |

This table illustrates the percentage of branched-chain amino acids in the Examples of the present invention, and, for comparison, the table illustrates the same calculations performed on some of the examples contained in U.S. Pat. No. 3,697,287. As can be seen, the prior art compositions consistently exhibit a lower component of branched chain amino acids. This is so not only because that disclosure does not recognize the benefits of increasing the branched chain component, but also because that disclosure teaches that the amino acid profile should approximate that naturally occurring in such foods as meat, eggs, or milk.

Identifying proper combinations of branched-chain amino acids and achieving proper methods of combining high branched-chain amino acids are not easy tasks. For example, the high percentage of Isoleucine in Example 2 appears to have caused the lower gastrointestinal tolerance of that composition. Example 4, which has a greater overall content of branched-chain amino acids, tasted just as good but did not cause gastrointestinal disturbances.

Several things are essential to achieve a good-tasting composition: (1) the ratio of amino acids, (2) the total amount of amino acids per dose, and (3) the amount of flavoring aids and carbohydrates necessary to offset or mask the poor taste of the amino acids. Numerous flavoring aids are known, which may be used either individually or in combination.

Table 2 contains the results of organoleptic evaluations of the five formulations represented by Examples 1-5. These evaluations were performed by a small group of marathon bicyclist who were given an unknown composition and asked to rate it on a scale of from good to terrible. A good rating meant that the composition was pleasant and generally acceptable. A fair rating meant that the composition was bland or neutral but was not objectionable. A poor rating meant that the composition had some flavor defect such as a somewhat objectionable bitter aftertaste. A terrible rating meant that the composition was so objectionable that it was rendered unpalatable.

In these examples, the amino acids were separated into two groups. The first group of amino acids consisting of isoleucine, leucine, methionine, threonine, alanine, glutamic acid, glycine, serine, and tyrosine, comprise the good to bland or neutral tasting amino acids. The second group of amino acids consists of valine, lysine, phenylalanine, tryptophan, arginine, aspartic acid, histidine, proline, and cysteine. It is this latter group for which the flavoring aids become most critical.

Separation of specific amino acids into flavor groups was accomplished through a separate taste test than the one previously described. In this taste test, a panel of about twenty volunteer testers was presented with unknowns which were evaluated for such characteristics as bitter, sweet, bland, or other, including unpalatable. A remarkably high level of agreement among the testers was observed when reviewing the test results pertaining to which amino acids were good, unacceptable, etc. The results were also remarkably consistent with the results from the taste test on the final blends, discussed supra. In other words, a blend containing a high concentration of "bad" tasting individual amino acids also exhibited a bad taste.

The taste test results for Example 3 demonstrate that when the percentage of bad to terrible tasting amino acids reaches 60.2%, they require the greatest amount of flavoring aids to make the mixture palatable. This is further illustrated by Example 5, using a composition which is identical to that of Example 3 except that the flavoring aids are significantly decreased to an amount comparable to the flavoring aid content of the Example 2 composition. It should be noted that whereas the Example 2 composition was good tasting, the Example 5 composition was barely acceptable. Additionally, the Example 2 mixture tastes better than the composition of Example 3, because the Example 2 mixture contains 72.4% of the good to bland tasting amino acids, whereas the Example 3 formulation contains only 39.8% of those amino acids. This relationship between taste and amino acid makeup holds true despite the fact that the Example 3 formulation contains a higher concentration of flavoring aids than does that of Example 2.

TABLE 2

AMINO ACID COMPOSITION AND PALATABILITY OF EXAMPLES

| Overall Taste Results: | EX 1 Good | EX 2 Good | EX 3 Fair | EX 4 Good | EX 5 Poor |
|---|---|---|---|---|---|
| Group 1: Good to Bland Tasting Individual Amino Acids | | | | | |
| % Ile* | 6.10% | 25.00% | 3.00% | 15.50% | 3.00% |
| % Leu* | 9.20% | 2.20% | 8.20% | 16.00% | 8.20% |
| % Met | 3.40% | 10.80% | 6.80% | 2.10% | 6.80% |
| % Thr | 4.40% | 2.40% | 1.40% | 2.90% | 1.40% |
| % Ala | 2.00% | 15.00% | 4.00% | 9.30% | 4.00% |
| % Glu | 20.40% | 0.00% | 6.50% | 0.00% | 6.50% |
| % Gly | 1.70% | 12.30% | 6.30% | 3.91% | 6.30% |
| % Ser | 5.30% | 2.00% | 3.00% | 2.39% | 3.00% |
| % Tyr | 4.30% | 0.00% | 0.60% | 0.47% | 0.60% |
|  | 56.80% | 72.40% | 39.80% | 52.57% | 39.80% |
| Group 2: Bad to Terrible Tasting Individual Amino Acids | | | | | |
| % Val* | 7.20% | 13.00% | 16.00% | 10.69% | 16.00% |
| % Lys | 8.20% | 1.00% | 9.30% | 13.92% | 9.30% |
| % Phe | 5.00% | 0.00% | 0.50% | 0.41% | 0.50% |
| % Trp | 1.20% | 0.50% | 3.50% | 1.02% | 3.50% |
| % Arg | 3.10% | 2.10% | 20.40% | 8.22% | 20.40% |
| % Asp | 6.10% | 1.00% | 4.20% | 0.32% | 4.20% |

TABLE 2-continued
AMINO ACID COMPOSITION AND PALATABILITY OF EXAMPLES

| Overall Taste Results: | EX 1 Good | EX 2 Good | EX 3 Fair | EX 4 Good | EX 5 Poor |
|---|---|---|---|---|---|
| % His | 2.10% | 2.10% | 3.20% | 4.02% | 3.20% |
| % Pro | 10.30% | 10.00% | 3.00% | 8.38% | 3.00% |
| % Cys | 0.00% | 0.60% | 0.00% | 0.45% | 0.00% |
|  | 43.20% | 27.60% | 60.20% | 47.43% | 60.20% |
| Flavoring Aids | | | | | |
| Carob | 90 g | | | | |
| Cocoa | 0 g | 56 g | 155 g | 50 g | 56 g |
| NF-Milk | 270 g | 150 g | 380 g | 90 g | 150 g |
| Carbohydrate Sources | | | | | |
| Sucrose | 100 g | 30 g | 110 g | 25 g | 110 g |
| Fructose | 20 g | 0 g | 0 g | 5 g | 0 g |
| Glucose | 10 g | 0 g | 0 g | 0 g | 0 g |
| Dextrose | 0 g | 20 g | 40 g | 59 g | 40 g |
| Poly-Glu | 0 g | 10 g | 130 g | 0 g | 130 g |
| Corn Syr | 0 g | 183 g | 0 g | 0 g | 0 g |
| Lodex | 100 g | 0 g | 0 g | 211 g | 0 g |

*Designates High Branched Chain Amino Acids

The composition made in accordance with the present invention can be digested with minimal energy. Since the nutrients are supplied by the invention in simple, readily available form, e.g., free amino acids, minimal digestive energy with maximal absorption is possible. As used in this application, the term "free amino acid" means monomeric amino acids or salts thereof but not the mixtures of amino acids that result from hydrolysis of a protein source. The use of a free amino acid source instead of a polypeptide protein source conserves energy, because polypeptide protein sources require energy to be enzymatically hydrolyzed. When digestive energy is conserved, more energy is available to be used for other functions in the athlete's body. Moreover, the high proportion of branched chain amino acids of the present invention helps to satisfy caloric and protein synthesis requirements during stress. Finally, the amino acids used in the present invention should be substantially free of impurities such as mercaptans, which could adversely affect the flavor of the composition.

Another beneficial result of the particular balance of ingredients in the claimed composition of the present invention is that these compositions exert a minimal osmotic effect on the gastrointestinal tract, thus preventing any fluid shifts. Fluid shifts can result in electrolyte and water imbalances that can lead to distension, cramping, nausea, and diarrhea. The compositions of the present invention can also be quickly absorbed, for the most part, in the stomach, the duodenum and the upper jejunum. Due to the unique properties of the compositions, almost all of the materials pass directly through the intestinal membranes, and are thus immediately available for replacing and maintaining the physiological demands of the stressed athlete. In this regard, it is desirable to minimize the fat content in the composition of the present invention. Fats are generally digested and absorbed relatively slowly, and may interfere with the breakdown and absorption of other dietary elements in the composition. In addition, fat is a relatively low efficiency energy source and is not well tolerated by the gastrointestinal tract of an athlete under physical stress. Thus, because the fat content of the present composition is minimized, gastric emptying is not delayed, blood shunted to the peritoneal region is minimal, and, as a result, more energy is available for use by the other body functions of the stressed athlete.

Thus, in accordance with the foregoing considerations, it has been determined that compositions meeting the foregoing objectives will have an amino acid profile in which the branched chain amino acids, as a percentage by weight of total free amino acids in the composition, comprise at least about 20% by weight, preferably at least about 25% by weight, and more preferably at least about 30% by weight. The branched chain amino acid content as a percentage by weight of total free amino acids in the composition should not exceed about 50% by weight, more preferably should not exceed about 45% by weight, and most preferably should not exceed about 40% by weight.

The composition of the present invention should include all of the essential amino acids in free form, and preferably includes the nonessential amino acids. The essential amino acids as used herein are L-isoleucine, L-leucine, L-valine, L-lysine, L-methionine, L-phenylalanine, L-threonine, and L-tryptophan. The nonessential amino acids, as used herein, refer to L-alanine, L-arginine, L-aspartic acid, L-glutamic acid, L-aminoacetic acid, L-histidine, L-proline, L-serine, L-tyrosine, and L-cysteine.

Also included in the composition of the present invention are nutrient factors such as vitamins and similar compounds, specifically vitamin A, vitamin D3, vitamin C, vitamin E, folic acid, thiamine, riboflavin, niacin, vitamin B6, vitamin B12, biotin, pantothenic acid, and vitamin K1.

The composition of the present invention also should contain appropriate amounts of the electrolytes, including sodium, potassium, chloride, calcium, and phosphate.

The compositions of the present invention may also include minerals and trace elements, including iron, magnesium, copper, zinc, manganese, selenium, molybdenum, chromium, and iodide.

These compositions also include carbohydrates which serve as one of the principal caloric sources, in addition to the branched-chain amino acids, for athletes using the composition. The carbohydrate content of the composition is preferably a combination of simple and complex saccharides. The simple sugars, or monosaccharides, may be glucose, dextrose, fructose, or corn syrup. The disaccharide used is preferably sucrose, but other disaccharides may be used. Finally, the complex carbohydrates used may include such moieties as polyglucose and malto-dextrin. The simple saccharides generally provide the most immediate energy to the athlete, but if the entire caloric content of the composition is, for example, in glucose, the resulting fluctuations in serum glucose level after ingestion of the composition may be unsatisfactory. Accordingly, the preferred composition will include a mixture of carbohydrates to provide sustained energy source and a more stable blood glucose level.

The flavoring aids used in the present invention may be any conventional flavoring aids that provide a pleasant-tasting composition when combined with the remainder of the ingredients. Conventional flavoring aids include natural or artificial grape, cherry, lemon, lime, punch, root beer, orange, grapefruit, strawberry, and other flavorings. The suitability of any particular flavoring aid in any particular composition of the present invention may be readily ascertained by means of a simple taste test. The preferred flavoring aids are cocoa, carob powder, vanilla extract, and powdered nonfat milk.

The composition of the present invention may advantageously be provided in unit dosage packages suitable for mixing with between 250 ml and 2 l of water or other liquid to provide a drink having an energy density of at least about 350 kcal per liter, preferably greater than about 400 kcal per liter and more preferably in excess of about 500 kcal per liter, wherein the net dry weight of a unit dosage package is from about 30 g to about 600 g, and preferably from about 80 g to about 120 g. In determining a desirable energy density for the final product, it is recognized that too low a density (e.g., too much water) can result in diarrhea, and can also require the athlete to ingest a greater fluid volume than is desirable in order to satisfy nutritional and caloric requirements. On the other hand, too high an energy density might supply insufficient fluid volume, might have too high an osmolality, causing gastric disturbances, and might also adversely affect palatability of the composition.

Certain specific ingredients that may be included in the composition of the present invention, together with ranges of those ingredients meeting the criteria discussed above, in a portion containing from about 10 to 30 grams free amino acids, are set forth in Table 3.

TABLE 3

| GENERAL COMPOSITION | | |
|---|---|---|
| Ingredient | Range | Preferred Range |
| Amino Acid | | |
| L-Isoleucine | 3.00%–25.00% | 6.00%–18.00% |
| L-Leucine | 2.20%–20.00% | 7.00%–19.00% |
| L-Valine | 4.00%–16.00% | 10.00%–14.00% |
| L-Lysine | 1.00%–14.00% | 10.00%–14.00% |
| L-Methionine | 1.00%–11.00% | 1.00%–5.00% |
| L-Phenylalanine | 0.00%–5.00% | 0.00%–3.00% |
| L-Threonine | 1.40%–4.40% | 2.00%–4.00% |
| L-Tryptophan | 0.00%–4.50% | 0.00%–4.00% |
| L-Alanine | 2.00%–15.00% | 7.00%–11.00% |
| L-Arginine | 2.10%–20.40% | 6.00%–10.00% |
| L-Aspartic Acid | 0.30%–6.10% | 0.30%–3.00% |
| L-Glutamic Acid | 0.00%–20.40% | 0.00%–6.50% |
| Aminoacetic Acid | 1.70%–12.30% | 4.00%–6.00% |
| L-Histidine | 2.10%–5.00% | 2.10%–4.00% |
| L-Proline | 3.00%–10.30% | 7.00%–10.00% |
| L-Serine | 2.00%–5.30% | 2.00%–3.00% |
| L-Tyrosine | 0.00%–4.30% | 0.00%–1.20% |
| L-Cysteine | 0.00%–1.50% | 0.00%–0.70% |
| Vitamin, Mineral & Trace Element | | |
| Vitamin A | 1000–7500 IU | 3750–7500 IU |
| Vitamin D3 | 150–600 IU | 300–600 IU |
| Vitamin E | 10–45 IU | 22–45 IU |
| Vitamin C | 90–400 mg | 190–400 mg |
| Folic Acid | 0.5–2 mg | 0.6–1.2 mg |
| Thiamine | 2.3–6 mg | 4.5–6.0 mg |
| Riboflavin | 2.6–8 mg | 5.1–7.0 mg |
| Niacin | 15–60 mg | 30–60 mg |
| Vitamin B6 | 1.5–6 mg | 3–6.0 mg |
| Vitamin B12 | 3–50 mcg | 9–20 mcg |
| Biotin | 0.25–1.8 mg | 0.9–1.8 mg |
| Pantothenic Acid | 7.5–90 mg | 15–60 mg |
| Vitamin K1 | 5–60 mcg | 30–40 mcg |
| Chlorine | 50–300 mg | 50–221 mg |
| Calcium | 0.4–4 g | 0.75–1.5 g |
| Phosphorus | 0.25–2 g | 0.75–1.5 g |
| Iodine | 50–325 mcg | 50–225 mcg |
| Iron | 3–325 mg | 14–40 mg |
| Magnesium | 100–600 mg | 150–600 mg |
| Copper | 0.75–6 mg | 1.5–3 mg |
| Zinc | 9–220 mg | 18–36 mg |
| Manganese | 0.6–4 mg | 1.40–2.8 mg |
| Selenium | 20–150 mcg | 75–150 mcg |
| Molybdenum | 20–150 mcg | 75–150 mcg |
| Chromium | 10–100 mcg | 25–60 mcg |
| Electrolytes | | |

TABLE 3-continued

| GENERAL COMPOSITION | | |
|---|---|---|
| Ingredient | Range | Preferred Range |
| Sodium Chloride | 20–160 mEq | 50–15 mEq |
| Potassium Chloride | 1–80 mEq | 15–40 mEq |
| Potassium Acetate | 5–60 mMol | 10–20 mMol |
| Sodium Phosphate | 1–30 mMol | 5–20 mMol |
| Calcium Gluconate | 0.46–20 mEq | 2–8 mEq |
| Carbohydrates | | |
| Sucrose | 5–100 grams | 20–100 grams |
| Glucose | 0–60 grams | 10–40 grams |
| Dextrose | 0–80 grams | 10–60 grams |
| Fructose | 0–100 grams | 10–40 grams |
| Poly-Glucose Lodex 10 DE (Malto-Dextrin) | 0–250 grams | 60–180 grams |
| | 0–300 grams | 90–250 grams |
| Corn Syrup | 0–184 grams | 50–120 grams |
| Flavoring Aids | | |
| Hershey's Cocoa | 20–85 grams | 45–65 grams |
| Carob Powder | 20–125 grams | 60–125 grams |
| Vanilla Extract | 0.25–2 grams | 0.5–1.2 grams |
| Powdered Non-fat Milk | 0–400 grams | 80–220 grams |

According to one application of the method of the present invention, a first mixture of free amino acids is dry blended until a transformation from discrete crystals to a fine amorphous uniform powder appearance is achieved. It has been observed that this transition from crystalline to amorphous form occurred at temperatures in excess of about 40° C. generated by blending action. Preferably, the first mixture of amino acids is blended under high shear conditions at speeds of at least about 15,000 rpm, preferably in excess of about 19,000 rpm, and most preferably from approximately 19,000 rpm to about 22,000 rpm. This first mixture of free amino acids is preferably blended for at least about one minute, more preferably in excess of 2.5 minutes and most preferably from about 2.5 to about 4.5 minutes. If this procedure is not followed, some of the individual amino acids will not go into solution upon reconstitution with water and will either float on the top or precipitate out.

A second mixture comprising nutrient factors is prepared, preferably by dry blending the nutrient factors in a powder mill until well mixed. The dry blending is preferably effected under conditions which, by application of shearing forces, yield a uniform particle size of less than about 30 microns, and more preferably from about 10 to 20 microns. The milling action takes these various materials which would otherwise not be blendable, and enables the production of a final, water soluble, homogeneous powder. The two mixtures are then combined together with any carbohydrates, electrolytes and flavoring aids and blended until a uniform consistency is achieved. This final blending may require more than about 20 minutes and perhaps as much as 40 minutes or more. The final blend is packaged appropriately and reconstituted with tap water just prior to use. The most important aspect of the method according to the present invention is the blending of the free amino acids in a distinct step under the conditions indicated. Although preparation of the second mixture has been disclosed as a distinct step, it may be possible to combine that step with the final mixing of all of the ingredients and still accrue the advantage of the present invention.

The invention may be more fully appreciated by reference to the appended examples. In each of Examples 1–5 which follow, the amino acids used are free, pure amino acids. The total percentage of each essential and non-essential amino acid for each example is given. Example 4, the composition preferred by marathon cyclists, has the highest percentage of total essential amino acids. Correspondingly, it has the lowest percentage of non-essential amino acids.

The various ranges of each of the ingredients used in the Examples is summarized in Table 3, supra. The preferred ranges are also shown for each ingredient. Each ingredient was not used in every one of Examples 1-5. For the specific composition of each formulation, refer back to the Examples.

EXAMPLE 1

In this example, 18 grams of free amino acids in amounts corresponding to the stated weight percentages were dry blended at speeds of between about 19,000 and 22,000 RPM, using a Waring model No. 34BL22 blender, for a period of between about 2.5 and 4.5 minutes, until a transition from separate discrete crystals to a fine amorphous uniform powder appearance was achieved. Next, the indicated amounts of vitamins, trace elements, and minerals were mixed in a dry blender until the milling action reduced these materials to a particle size of between about 10 and 20 microns. Thereafter, the indicated amounts of carbohydrates, electrolytes and flavoring aids were weighed and all of the ingredients were blended in a Patterson Kelley twin-shell model No. LB-16S liquids/solids blender-granulator, equipped with an intensifier bar, for a period of approximately 20–40 minutes. Finally, the blend was brought up to two liters final volume with water, and taste tested. The composition exhibited a good taste.

| Amino Acid Profile based on 18 grams total Amino Acids | |
|---|---|
| Amino Acid | % Total Amino Acids |
| Essential | |
| L-Isoleucine | 6.10% |
| L-Leucine | 9.20% |
| L-Valine | 7.20% |
| L-Lysine | 8.20% |
| L-Methionine | 3.40% |
| L-Phenylalanine | 5.00% |
| L-Threonine | 4.40% |
| L-Tryptophan | 1.20% |
| Total essential amino acids | 44.70% |
| Non-Essential | |
| L-Alanine | 2.00% |
| L-Arginine | 3.10% |
| L-Aspartic Acid | 6.10% |
| L-Glutamic Acid | 20.40% |
| Aminoacetic Acid | 1.70% |
| L-Histidine | 2.10% |
| L-Proline | 10.30% |
| L-Serine | 5.30% |
| L-Tyrosine | 4.30% |
| Total non-essential amino acids | 55.30% |

| Vitamin, Mineral & Trace Elements | | % US RDA |
|---|---|---|
| Vitamin A | 7500 IU | 150 |
| Vitamin D3 | 600 IU | 150 |
| Vitamin E | 45 IU | 150 |
| Vitamin C | 380 mg | 633 |
| Folic Acid | 1.2 mg | 300 |
| Thiamine | 4.5 mg | 300 |
| Riboflavin | 5.1 mg | 300 |
| Niacin | 60 mg | 300 |
| Vitamin B6 | 6 mg | 300 |
| Vitamin B12 | 18 mcg | 300 |
| Biotin | 0.9 mg | 300 |
| Pantothenic Acid | 30 mg | 300 |
| Vitamin K1 | 67 mcg | * |
| Chlorine | 221 mg | * |
| Calcium | 1.5 g | 150 |
| Phosphorus | 1.5 g | 150 |
| Iodine | 225 mcg | 150 |
| Iron | 27 mg | 150 |
| Magnesium | 600 mg | 150 |
| Copper | 3 mg | 150 |
| Zinc | 36 mg | 240 |
| Manganese | 2.81 mg | * |
| Selenium | 150 mcg | * |
| Molybdenum | 150 mcg | * |
| Chromium | 50 mcg | * |
| Electrolytes Chart | | |
| Sodium Chloride | 90 mEq | |
| Potassium Chloride | 40 mEq | |
| Carbohydrate Chart | | |
| Sucrose | 100 grams | |
| Fructose | 20 grams | |
| Lodex 10 DE (Malto-Dextrin) | 100 grams | |
| Glucose | 10 grams | |
| Flavoring Aids | | |
| Carob Powder | 90 grams | |
| Non-Fat Dry Milk | 270 grams | |

*No U.S. RDA established

EXAMPLE 2

The following composition was prepared in the same way as set forth in Example 1 to make two liters of final composition. In this Example, the vitamin, mineral and trace element composition remained the same as in Example 1. However, the amount of NaCl was decreased from 90 mEq to 88 mEq. Sucrose was reduced from 100 g to 30 g. 20 g of dextrose, 183 g of corn syrup, and 10 g of poly glucose were added. Fructose and Lodex 10 DE were omitted. Also, the flavoring aids were changed as indicated. Upon taste testing, this mixture was determined to have good palatability.

| Amino Acid Profile based on 26 grams total Amino Acids | |
|---|---|
| Amino Acid | % Total Amino Acids |
| Essential | |
| L-Isoleucine | 25.00% |
| L-Leucine | 2.20% |
| L-Valine | 13.00% |
| L-Lysine | 1.00% |
| L-Methionine | 10.80% |
| L-Threonine | 2.40% |
| L-Tryptophan | 0.50% |
| Total essential amino acids | 54.90% |
| Non-Essential | |
| L-Alanine | 15.00% |
| L-Arginine | 2.10% |
| L-Aspartic Acid | 1.00% |
| Aminoacetic Acid | 12.30% |
| L-Histidine | 2.10% |
| L-Proline | 10.00% |
| L-Serine | 2.00% |
| L-Cysteine | 0.60% |
| Total non-essential amino acids | 45.10% |

| Vitamin, Mineral & Trace Elements | | % US RDA |
|---|---|---|
| Vitamin A | 7500 IU | 150 |
| Vitamin D3 | 600 IU | 150 |
| Vitamin E | 45 IU | 150 |
| Vitamin C | 380 mg | 633 |
| Folic Acid | 1.2 mg | 300 |
| Thiamine | 4.5 mg | 300 |
| Riboflavin | 5.1 mg | 300 |
| Niacin | 60 mg | 300 |
| Vitamin B6 | 6 mg | 300 |
| Vitamin B12 | 18 mcg | 300 |
| Biotin | 0.9 mg | 300 |
| Pantothenic Acid | 30 mg | 300 |
| Vitamin K1 | 67 mcg | * |
| Chlorine | 221 mg | * |

| Amino Acid Profile based on 26 grams total Amino Acids | | |
|---|---|---|
| Calcium | 1.5 g | 150 |
| Phosphorus | 1.5 g | 150 |
| Iodine | 225 mcg | 150 |
| Iron | 27 mg | 150 |
| Magnesium | 600 mg | 150 |
| Copper | 3 mg | 150 |
| Zinc | 36 mg | 240 |
| Manganese | 2.81 mg | * |
| Selenium | 150 mcg | * |
| Molybdenum | 150 mcg | * |
| Chromium | 50 mcg | * |
| Electrolytes Chart | | |
| Sodium Chloride | 88 mEq | |
| Potassium Acetate | 40 mEq | |
| Carbohydrate Chart | | |
| Sucrose | 30 grams | |
| Dextrose | 20 grams | |
| Corn Syrup | 183 grams | |
| Poly-Glucose | 10 grams | |
| Flavoring Aids | | |
| Hershey's Cocoa | 56 grams | |
| Powdered Milk | 150 grams | |

*No U.S. RDA established

EXAMPLE 3

In Example 3, prepared in a similar manner to the foregoing examples to make two liters of composition, all of the vitamins, minerals, and trace elements were reduced by one-half. NaCl was increased to 138 mEq and 5 mEq of calcium gluconate was added. Sucrose was increased to 110 g, dextrose increased to 40 g, and poly-glucose to 130 g. In this example, Hershey's cocoa was increased to 155 g, and non-fat dry powdered milk increased to 380 grams. This example exhibited only fair palatability.

| Amino Acid Profile based on 11 grams total Amino Acids | |
|---|---|
| Amino Acid | % Total Amino Acids |
| Essential | |
| L-Isoleucine | 3.00% |
| L-Leucine | 8.20% |
| L-Valine | 16.00% |
| L-Lysine | 9.30% |
| L-Methionine | 6.80% |
| L-Phenylalanine | 0.50% |
| L-Threonine | 1.40% |
| L-Tryptophan | 3.50% |
| Total essential amino acids | 48.70% |
| Non-Essential | |
| L-Alanine | 4.00% |
| L-Arginine | 20.40% |
| L-Aspartic Acid | 4.30% |
| L-Glutamic Acid | 6.50% |
| Aminoacetic Acid | 6.30% |
| L-Histidine | 3.20% |
| L-Proline | 3.00% |
| L-Serine | 3.00% |
| L-Tyrosine | 0.60% |
| Total non-essential amino acids | 51.30% |
| Vitamin, Mineral & Trace Elements | % US RDA |
| Vitamin A | 3750 IU | 75 |
| Vitamin D3 | 300 IU | 75 |
| Vitamin E | 22.5 IU | 75 |
| Vitamin C | 190.0 mg | 317 |
| Folic Acid | 0.6 mg | 150 |
| Thiamine | 2.3 mg | 150 |
| Riboflavin | 2.6 mg | 150 |
| Niacin | 30 mg | 150 |
| Vitamin B6 | 3 mg | 150 |
| Vitamin B12 | 9 mcg | 150 |
| Biotin | 0.5 mg | 150 |
| Pantothenic Acid | 15 mg | 150 |

| Amino Acid Profile based on 11 grams total Amino Acids | | |
|---|---|---|
| Vitamin K1 | 34 mcg | * |
| Chlorine | 111 mg | * |
| Calcium | 0.75 g | 75 |
| Phosphorus | 0.75 g | 75 |
| Iodine | 113 mcg | 75 |
| Iron | 14 mg | 75 |
| Magnesium | 300 mg | 75 |
| Copper | 1.5 mg | 75 |
| Zinc | 18 mg | 120 |
| Manganese | 1.40 mg | * |
| Selenium | 75 mcg | * |
| Molybdenum | 75 mcg | * |
| Chromium | 25 mcg | * |
| Electrolytes Chart | | |
| Sodium Chloride | 138 mEq | |
| Potassium Chloride | 40 mEq | |
| Calcium Gluconate | 5 mEq | |
| Carbohydrate Chart | | |
| Sucrose | 110 grams | |
| Dextrose | 40 grams | |
| Poly-Glucose | 130 grams | |
| Flavoring Aids | | |
| Hershey's Cocoa | 155 grams | |
| Powdered Milk | 380 grams | |

*No U.S. RDA established

EXAMPLE 4

Example 4 was also prepared in a manner similar to the foregoing examples to make two liters. The composition in this example was favored by marathon cyclists, and was considered to exhibit good palatability. This composition had the highest percentage of total essential amino acids, and correspondingly, the lowest percentage of total nonessential amino acids. In this example, most of the vitamins, minerals, and trace elements were reduced to 30% of the U.S. R.D.A. Sodium chloride was reduced to 20.5 mEq, and KCl was reduced to 6.70 mEq. Calcium gluconate was increased to 6.97 mEq, and 7.24 mMol sodium phosphate and 1000 mg ascorbic acid were added. The carbohydrates and flavoring aids were modified as indicated in the example.

| Amino Acid Profile based on 16 grams total Amino Acids | |
|---|---|
| Amino Acid | % Total Amino Acids |
| Essential | |
| L-Isoleucine | 15.50% |
| L-Leucine | 16.00% |
| L-Valine | 10.69% |
| L-Lysine | 13.92% |
| L-Methionine | 2.10% |
| L-Phenylalanine | 0.41% |
| L-Threonine | 2.90% |
| L-Trptophan | 1.02% |
| Total essential amino acids | 62.54% |
| Non-Essential | |
| L-Alanine | 9.30% |
| L-Arginine | 8.22% |
| L-Aspartic Acid | 0.32% |
| Aminoacetic Acid | 3.91% |
| L-Histidine | 4.02% |
| L-Proline | 8.38% |
| L-Serine | 2.39% |
| L-Tyrosine | 0.47% |
| L-Cysteine | 0.45% |
| Total non-essential amino acids | 37.46% |
| Vitamin, Mineral & Trace Elements | % US RDA |
| Vitamin A | 1500.00 IU | 30.0% |
| Vitamin D3 | 120.00 IU | 30.0% |
| Vitamin E | 9.00 IU | 30.0% |

-continued

| Amino Acid Profile based on 16 grams total Amino Acids | | |
|---|---|---|
| Vitamin C | 36.00 mg | 60.0% |
| Folic Acid | 0.24 mg | 60.0% |
| Thiamine | 0.90 mg | 60.0% |
| Riboflavin | 1.02 mg | 60.0% |
| Niacin | 12.00 mg | 60.0% |
| Vitamin B6 | 1.20 mg | 60.0% |
| Vitamin B12 | 3.60 mcg | 60.0% |
| Biotin | 3.00 mcg | 60.0% |
| Pantothenic Acid | 6.00 mg | 60.0% |
| Vitamin K1 | 13.40 mcg | * |
| Chlorine | 44.20 mcg | * |
| Calcium | 300.00 mg | 30.0% |
| Phosphorus | 300.00 mg | 30.0% |
| Iodine | 45.00 mcg | 30.0% |
| Magnesium | 120.00 mg | 30.0% |
| Copper | 0.60 mg | 30.0% |
| Zinc | 6.00 mg | 40.0% |
| Manganese | 562.00 mcg | * |
| Selenium | 30.00 mcg | * |
| Molybdenum | 30.00 mcg | * |
| Chromium | 10.00 mcg | * |
| Iron | 4.80 mg | 30.00% |
| Electrolytes Chart | | |
| Sodium Chloride | 20.50 mEq | |
| Potassium Chloride | 6.70 mEq | |
| Calcium Gluconate | 6.97 mEq | |
| Sodium Phosphate | 7.24 mMol | |
| Ascorbic Acid | 1000 mg | |
| Carbohydrate Chart | | |
| Sucrose | 25 grams | |
| Fructose | 5 grams | |
| Dextrose | 59 grams | |
| Lodex 10 DE (Malto-Dextrin) | 211 grams | |
| Flavoring Aids | | |
| Hershey's Cocoa | 50 grams | |
| Non-Fat Dry Milk | 90 grams | |

*No U.S. RDA established.

EXAMPLE 5

This example was identical to Example 3, except that the Cocoa was reduced from 155 g to 56 g, and the non-fat powdered milk was reduced from 380 g to 150 g. These changes caused the palatability of the mixture to go from fair in Example 3 to poor in Example 5.

EXAMPLE 6

In this experiment, the composition of Example 4 was dissolved in water at a ratio of approximately 116 grams of the solid to yield approximately 500 cc final composition, achieving an energy density of approximately 343 kcal per 500 cc of the final composition. This composition was ingested by a marathon bicyclist during a 380 mile, non-stop training ride from Fallbrook, California to Las Vegas, Nevada. The period of continuous exertion was approximately 22 hours and 20 minutes, during which period sufficient nutritional mixture to supply approximately 7,480 kcal was ingested. Blood analysis of samples obtained immediately prior to and following the trip yielded the following data:

| Analyte | Reference Range* | Pre-Ride | Post-Ride |
|---|---|---|---|
| Glucose | 70–115 | 99 | 86 |
| Bun | 10–25 | 27 | 32 |
| Creatinine | 0.7–1.4 | 1.1 | 1.3 |
| Bun/Creatinine | 10–30 | 24.5 | 24.6 |
| AST (SGOT) | 1–50 | 48 | 61 |
| ALT (SGPT) | 1–55 | 34 | 37 |
| GGTP | 2–65 | 10 | 9 |
| Bilirubin | 0–1.3 | 0.3 | 1.0 |
| Alk. Phos. | 30–105 | 46 | 50 |
| Ca | 9.0–11.0 | 9.3 | 10.2 |

-continued

| Analyte | Reference Range* | Pre-Ride | Post-Ride |
|---|---|---|---|
| LDH | 100–225 | 235 | 249 |
| Phosphorous | 2.6–4.5 | 4.1 | 5.3 |
| Na | 137–148 | 142 | 142 |
| K | 3.6–5.5 | 4.3 | 4.1 |
| Cl | 98–108 | 105 | 102 |
| Uric Acid | 2.5–8.0 | 5.0 | 3.7 |
| Triglyceride | 50–200 | 57 | 48 |
| Cholesterol | 150–300 | 187 | 175 |
| Total Protein | 6.0–8.0 | 6.1 | 6.2 |
| Albumin | 3.5–5.0 | 4.1 | 4.2 |
| Globulin | 2.0–3.5 | 2.0 | 2.0 |
| A/G Ratio | 1.1–2.3 | 2.1 | 2.1 |
| Iron | 50–210 | 121 | 88 |
| Ferritin | 20–300 | 160 | ** |
| Hgb | 16.0 ± 2 | 14.2 | 14.8 |
| MCV | 82–101 | 92 | 92 |
| MCH | 27–34 | 31.5 | 31.5 |
| MCHC | 34 ± 2 | 34.2 | 34.1 |
| WBC | 7.5 ± 3.5 | 7.5 | 7.4 |
| Mg-Serum | 1.5–2.5 | 1.8 | ** |
| Zn-Serum | 60–130 | 92 | ** |
| Hct | 47 ± 5 | 41.4 | 43.5 |
| RBC | 5.4 ± 0.7 | 4.50 | 4.71 |

*Generally accepted normal values
**Data not available

The rider was very pleased overall with the nutrient blend, and it did not cause any gastrointestinal disturbances or diarrhea.

These data demonstrate the remarkable ability of the compositions of the present invention, when used as a sole nutritional source, to maintain blood values of numerous important physiological substances within the normal range, despite sustained, extraordinary exertion. Particularly significant are the stable values for the electrolytes Na, Cl Ca, K, and phosphorus, which are ordinarily volatile in response to stress, and the uric acid and creatinine values, relating to protein breakdown and fluid balance.

EXAMPLE 7

In this experiment the composition of Example 4 was ingested by a competitor in a 3,120 mile bicycle race known as the 1986 Race Across America. During the race one of the bicyclists ingested an amount of said composition containing 45,730 kcal, which comprised 77.3% of that racer's total caloric intake. Immediately prior to and following the race, total weight, percent of body fat, and percent lean body mass were determined for this bicyclist (identified by the letter A in Tables 4, 5, and 6, reproduced infra) and for the 6 other competitors completing the race who did not use the compound of the present invention (identified by the letters B, C, D, E, F, and G in the Tables reproduced infra). Percent body fat was computed based upon the electrical resistance measured between a point on a wrist and a point on the opposite ankle using an RJL System BIA-103 body composition analyzer. Lean body mass was the difference between total weight and the amount of body fat.

The raw data are summarized in Tables 4 and 5.

TABLE 4

| PRE-RACE BODY COMPOSITION DATA | | | | | | |
|---|---|---|---|---|---|---|
| Contestant | Age | Ht (in) | Initial Total Weight (lbs) | Initial Skin Resistivity (ohms) | Initial % Body Fat | Initial Lean Body Mass (lbs) |
| A | 43 | 69 | 140 | 479 | 8.3 | 126.5 |

TABLE 4-continued
PRE-RACE BODY COMPOSITION DATA

| Contestant | Age | Ht (in) | Initial Total Weight (lbs) | Initial Skin Resistivity (ohms) | Initial % Body Fat | Initial Lean Body Mass (lbs) |
|---|---|---|---|---|---|---|
| B | 28 | 73 | 192 | 403 | 9.7 | 173.4 |
| C | 23 | 72 | 168 | 472 | 13.1 | 146.1 |
| D | 26 | 68 | 140 | 507 | 13.2 | 121.5 |
| E | 30 | 73 | 180 | 439 | 11.0 | 160.2 |
| F | 29 | 62 | 119 | 571 | 23.6 | 90.9 |
| G | 32 | 68.5 | 155 | 588 | 28.5 | 110.8 |

TABLE 5
POST-RACE BODY COMPOSITION DATA

| Contestant | Final Total Weight (lbs) | Height (in) | Skin Resistivity (ohms) | Final % Body Fat | Final Lean Body Mass (lbs) |
|---|---|---|---|---|---|
| A | 138 | 69 | 439 | 6.9 | 128.4 |
| B | 188 | 73.5 | 372 | 7.4 | 174.1 |
| C | 160 | 72 | 431 | 7.6 | 147.9 |
| D | 133.5 | 68 | 397 | 5.5 | 126.2 |
| E | 175 | 73 | 365 | 6.1 | 164.4 |
| F | 110 | 62 | 469 | 11.2 | 97.7 |
| G | 160 | 68 | 495 | 22 | 124.8 |

These data have been summarized in the following Table 6 with the competitors arranged in order of finishing time. Competitors A through E were male and F and G were female. This Table illustrates that competitor A, who used the composition of the present invention, experienced the smallest change in percent body fat, the smallest change in percent total weight, and the second smallest change in lean body mass. That competitor also won the race by more than 22 hours. This experiment demonstrates the remarkable ability of the composition according to the invention to maintain a high degree of stability in terms of the measured body composition variables, under conditions of extraordinary physical stress.

TABLE 6
Race Finish Times v. Changes in Body Composition

| Contestant | Race Time (hr) | % Change in Body Fat | % Change in Total Weight | Change in Lean Body Mass |
|---|---|---|---|---|
| A | 201.78 | −1.4 | −1.4 | +1.9 |
| B | 224.03 | −2.3 | −2.1 | +.7 |
| C | 224.95 | −5.5 | −4.8 | +1.8 |
| D | 239.17 | −7.7 | −4.6 | +4.7 |
| E | 245.95 | −4.9 | −2.8 | +4.2 |
| F | 242.07 | −12.4 | −3.5 | +6.8 |
| G | 249.48 | −6.5 | +3.2 | +14.0 |

Figure 1:
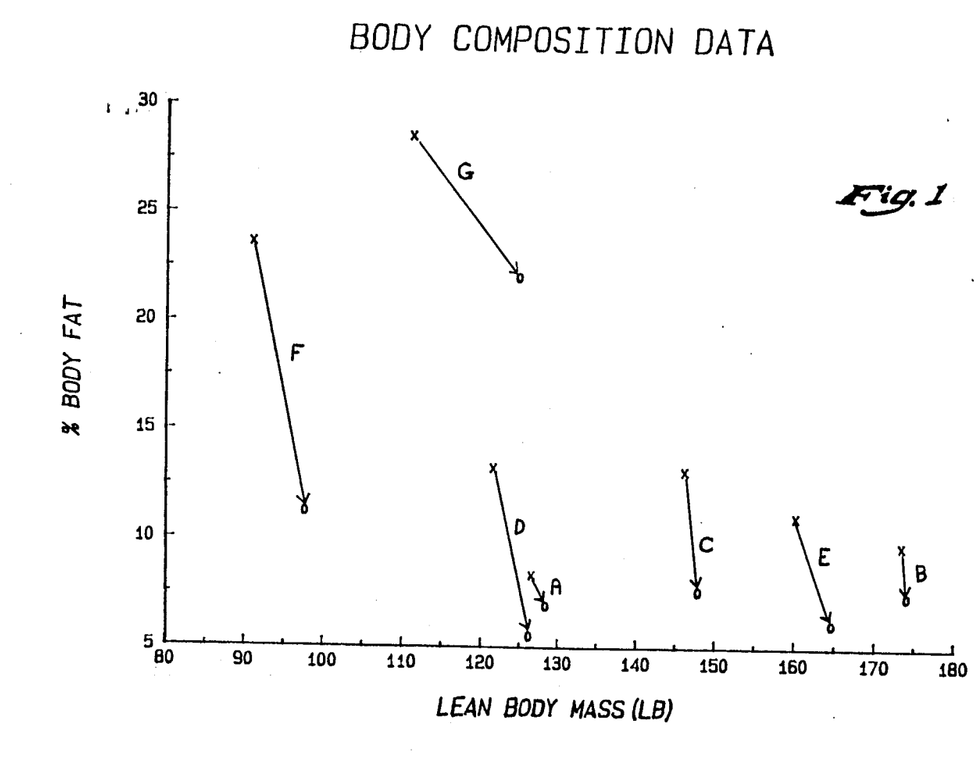
FIG. 1 is a graph of the data relating to changes in percentage body fat and lean body mass reported in Example 7.

The foregoing data are graphically illustrated in FIG. 1. FIG. 1 is another example of the utility of this invention. The composition of this invention as shown in Example 4, represented 77.3% of the total caloric intake by contestant A during the 1986 RAAM.

FIG. 1 shows pre-race and post-race body composition data for all race finishers. Pre-race data are plotted with an "x" symbol and post-rate data with an "o" symbol. Lines are drawn between the pre-race and postrace points for each race finisher. Thus, the total length of the line for each race finisher represents the combined change in percent body fat and lean body mass (lbs.).

It can be easily seen that contestant A demonstrated the smallest combined change in these two parameters, or expressed differently, contestant A demonstrated the most stable overall body composition before, during, and after the race.

Although this invention has been described in terms of certain preferred compositions within a stated range, and certain discrete method steps, other embodiments that are apparent to those of ordinary skill in the art are also within the scope of this invention. Accordingly, the scope of the invention is intended to be determined by reference to the appended claims.

What I claim is:

1. A palatable, orally ingestible nutrient composition for athletes, comprising:
electrolytes, carbohydrates, nutrient factors, and free amino acids, wherein the amino acids, expressed as an approximate weight percent of total free amino acids, comprise:

| | |
|---|---|
| L-Isoleucine | 15.50% ± 2% |
| L-Leucine | 16.00% ± 2% |
| L-Valine | 10.69% ± 2% |
| L-Lysine | 13.92% ± 2% |
| L-Methionine | 2.10% ± 1% |
| L-Phenylalanine | 0.41% ± 0.2% |
| L-Threonine | 2.90% ± 1.5% |
| L-Tryptophan | 1.02% ± 0.5% |
| L-Alanine | 9.30% ± 2% |
| L-Arginine | 8.22% ± 2% |
| L-Aspartic Acid | 0.32% ± 0.15% |
| Aminoacetic Acid | 3.91% ± 1.8% |
| L-Histidine | 4.02% ± 2% |
| L-Proline | 8.38% ± 2% |
| L-Serine | 2.39% ± 1% |
| L-Tyrosine | 0.47% ± 0.2% |
| L-Cysteine | 0.45% ± 0.2%. |

2. A nutrient composition as in claim 1, wherein the total free amino acid content is approximately 16 grams, and wherein the nutrient factors are present in the approximate amounts of:

| | |
|---|---|
| Vitamin A | 1500.00 IU |
| Vitamin D3 | 120.00 IU |
| Vitamin E | 9.00 IU |
| Vitamin C | 36.00 mg |
| Folic acid | 0.24 mg |
| Thiamine | 0.90 mg |
| Riboflavin | 1.02 mg |
| Niacin | 12.00 mg |
| Vitamin B6 | 1.20 mg |
| Vitamin B12 | 3.60 mcg |
| Biotin | 3.00 mg |
| Pantothenic acid | 6.00 mg |
| Vitamin K1 | 13.40 mcg |
| Chlorine | 44.20 mcg |
| Calcium | 300.00 mg |
| Phosphorus | 300.00 mg |
| Iodine | 45.00 mcg |
| Magnesium | 120.00 mg |
| Copper | 0.60 mg |
| Zinc | 6.00 mg |
| Manganese | 562.00 mcg |
| Selenium | 30.00 mcg |
| Molybdenum | 30.00 mcg |
| Chromium | 10.00 mcg |
| Iron | 4.80 mg; | the electrolytes, in approxiamte amounts, comprise:

| | |
|---|---|
| Sodium Chloride | 20.50 mEq |
| Potassium Chloride | 6.70 mEq |
| Calcium Gluconate | 6.97 mEq |
| Sodium Phosphate | 7.24 mMol |

| | | |
|---|---|---|
| Ascorbic Acid | 1000 mg; | | the carbohydrates, in approximate amounts, comprise:

| | |
|---|---|
| Sucrose | 25 grams |
| Fructose | 5 grams |
| Dextrose | 59 grams |
| Malto-Dextrin | 211 grams; and | the flavoring aids, in approximate amounts, comprise:

| | |
|---|---|
| Cocoa | 50 grams |
| Non-Fat Dry Milk | 90 grams. |

3. A method for the preparation of a palatable, orally ingestible nutrient blend, comprising the steps of:

(a) preparing a first mixture consisting essentially of pure essential and non-essential free amino acids wherein the amino acids, expressed as an approximate weight percent of total free amino acid, comprise:

| | | |
|---|---|---|
| L-Isoleucine | 15.50% | ±2% |
| L-Leucine | 16.00% | ±2% |
| L-Valine | 10.69% | ±2% |
| L-Lysine | 13.92% | ±2% |
| L-Methionine | 2.10% | ±1% |
| L-Phenylalanine | 0.41% | ±0.2% |
| L-Threonine | 2.90% | ±1.5% |
| L-Tryptophan | 1.02% | ±0.5% |
| L-Alanine | 9.30% | ±2% |
| L-Arginine | 8.22% | ±2% |
| L-Aspartic Acid | 0.32% | ±0.15% |
| Aminoacetic Acid | 3.91% | ±1.8% |
| L-Histidine | 4.02% | ±2% |
| L-Proline | 8.38% | ±2% |
| L-Serine | 2.39% | ±1% |
| L-Tyrosine | 0.47% | ±0.2% |
| L-Cysteine | 0.45% | ±0.2% |

(b) dry-blending the mixture of free amino acids under high shear conditions to effect a transition from a crystalline to an amorphous appearance;

(c) preparing a second mixture of nutrient factors comprising vitamins, trace elements and minerals;

(d) dry-blending said mixture of nutrient factors to a uniform particle size of between about 10 and 20 microns;

(e) preparing a third mixture comprising carbohydrates, electrolytes, and flavoring aids; and (f) combining said first, second and third mixtures into a homogeneous powder.

4. A method as in claim 3, further comprising:

A final step of mixing the blend with a liquid to produce an orally ingestible, palatable produce having at least 350 kcal/liter which provides substantially all of the nutritional, carbohydrate and energy requirements of an athlete under conditions of physical stress, without interfering with fluid absorption or causing gastro intestinal disturbances.

5. A method as in claim 4, wherein said liquid comprises water.

6. A method of meeting the nutritional requirements of an athlete, said method comprising:

orally administering to an athlete undergoing physical stress a composition according to claim 1, thereby providing substantially all of the nutritional, carbohydrate and energy requirements of said athlete under conditions of physical stress without interfering with fluid absorption or causing gastrointestinal disturbances.

* * * * *